June 2, 1942.   L. C. BROECKER   2,284,971
PNEUMATIC VALVE
Filed Nov. 3, 1939
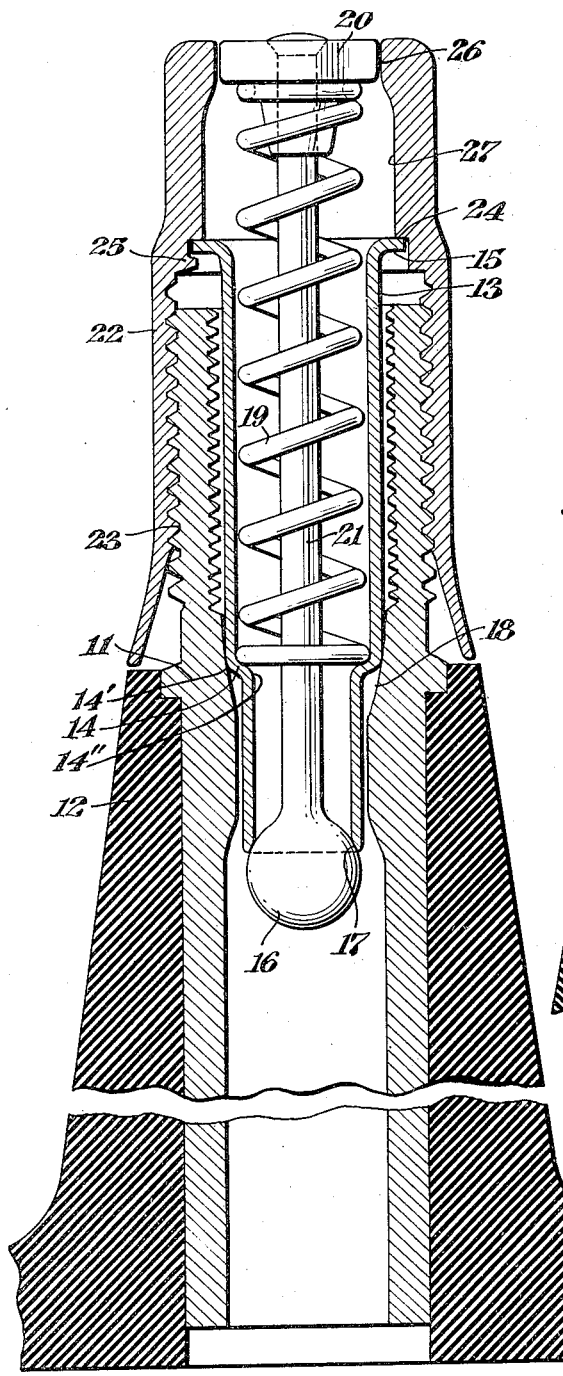
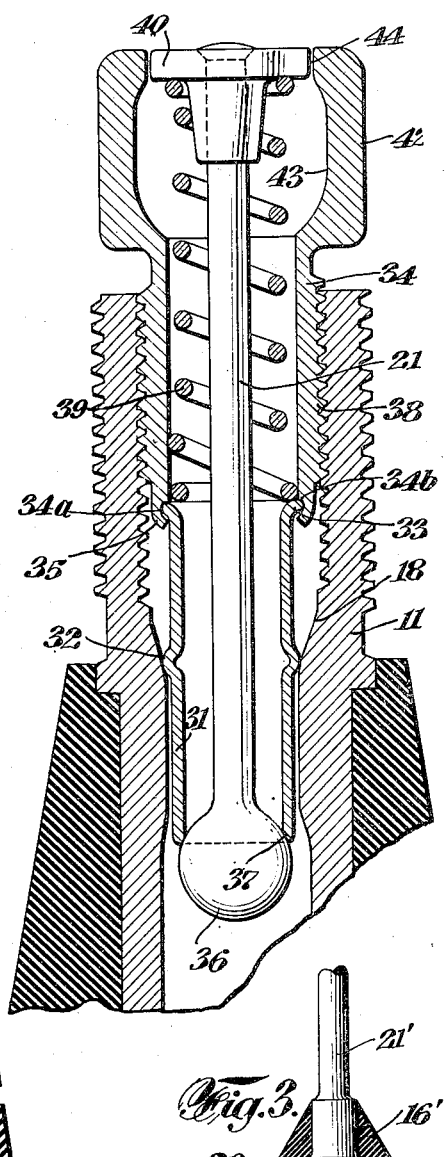
INVENTOR
Lewis C. Broecker
BY Kenyon & Kenyon
ATTORNEYS Patented June 2, 1942

2,284,971

UNITED STATES PATENT OFFICE 2,284,971

PNEUMATIC VALVE

Lewis C. Broecker, Nichols, Conn., assignor to Bridgeport Brass Company, Bridgeport, Conn., a corporation of Connecticut Application November 3, 1939, Serial No. 302,661

3 Claims. (Cl. 277—42)

This invention relates to pneumatic valves and more especially to bus or truck pneumatic valves which are subjected to high temperatures during operation.

An object of this invention is an all-metal capless tire valve which is effective in operation, is simple to manufacture and assemble, does not deteriorate with age and is unaffected by heat.

In a tire valve embodying the invention, the construction and arrangement of the valve parts is such as to permit the use of a stronger valve spring than is ordinarily used in a tire valve, thereby insuring an air-tight seal between the metal members comprising the valve body and valve seat. Also, ample clearance is provided around and through such spring for speedy air passage so that inflation speed of the valve is far greater than that of the conventional valves now in use. The end of the air passageway is normally closed by a plug which is movable by air pressure into a chamber in the passageway of sufficiently larger diameter than the plug to permit free flow of air around the periphery of the plug.

Other objects, novel features and advantages of this invention will become apparent from the following specification and accompanying drawing. wherein:

Fig. 1 is a longitudinal section through a tire valve embodying one modification of the invention. and Fig. 2 is a longitudinal section through a tire valve embodying another modification of the invention.

Fig. 3 is a section embodying a modified form of the valve body of the invention.

In Fig. 1, 11 is a conventional metal valve stem which may, as herein shown, be provided with a rubber covering 12. A barrel 13 is adapted to be positioned within the stem, the lower end of the barrel being reduced in diameter at 14 to form an exterior shoulder 14' and an interior shoulder 14". The upper end of the barrel is provided or formed with an outwardly extending lateral flange 15. A valve body 16 is provided on the lower end of center pin 21 for cooperation with a valve seat 17 formed by the lower end of the barrel 13. This lower end of the barrel is exteriorly coated from a point slightly above the exterior shoulder 14' and around the valve seat 17, with a layer of soft metal, such, for example, as lead or a tin lead alloy. The interior of the stem 11 is provided with a tapered or beveled surfaced portion 18 which constitutes a seat for the exterior shoulder 14'. The soft metal coating provides airtight joints between the valve body 16 and the seat 17 and also between the tapered portion 18 and the exterior shoulder 14'.

The inner shoulder 14" supports the inner or lower end of a coil spring 19, the upper end of which spring engages a button or disc member 20 fastened to the upper end of the center pin 21. The spring 19 surrounds the center pin 21 and is stronger than the usual valve tire spring, and the use of such spring is made possible because of the extra amount of space provided for the spring by the construction of the valve. In addition, ample clearance is provided through and around the spring for free passage of air through the barrel 13. The lowest coil of the spring is preferably made of slightly larger diameter than the rest, so that it may engage frictionally with the side wall of the barrel 13 while the upper coils are slightly spaced therefrom.

A sleeve or hollow cap 22 is interiorly threaded at 23 to fit the outer threads of the conventional valve stem 11. A shoulder 24 is formed on the inner surface of the cap 22, against which shoulder 24 the flange 15 of the barrel 13 engages, thus forcing the exterior shoulder 14' of barrel 13 against the tapered seat 18 of the stem 11 when the cap 22 is screwed onto such stem. The cap 22 is permanently connected with the barrel 13 for rotation relative thereto by a plurality of lugs 25 formed at intervals by pushing or upsetting the metal on the inside of the sleeve 22 just below the shoulder 24 after the flange 15 has been placed in contact with the shoulder 24.

The button 20 not only serves to transmit the force of the spring 19 to the center pin 21 and valve body 16, but also constitutes a closing plug for the opening 26 in the sleeve 22, thus effectively preventing dust and other foreign matter from entering the sleeve. The bore of the sleeve 22, as compared with its opening 26, is enlarged at 27, thus providing clearance between the periphery of the button 20 and the interior of the bore when the button 10 is moved inwardly so that air may freely flow into and through the sleeve.

In the modification illustrated in Fig. 2, the barrel 31 is formed to provide a rib or bead 32 adapted to engage the tapered seat 18 of the stem 11. At its outer or upper end the barrel 31 has an outwardly and laterally extending flange 33 which loosely fits into a recess 34a, provided in the lower end of the sleeve or screw plug 34.

The lower end of this plug 34 is turned inwardly, as at 35. The flange 33 fits in the recess 34a between the end 35 and the shoulder 34b and thus the barrel 31 and sleeve 34 are connected for free relative rotation. A metal valve body 36 is provided for cooperation with a valve seat 37 formed at the bottom or lower edge of the barrel 31. This valve body 36 may be spherical in form, or conical in form. The lower portion of the barrel 31 is preferably exteriorly coated with soft metal, such, for example, as lead or tin lead alloy, beginning with a point just above the rib 32 around the lower end of the barrel.

On the outer surface of the sleeve 34 are provided threads 38 of proper size to screw freely into the interior threads of conventional valve stems, thus pressing the shoulder 34b against the top of the flange 33 which in turn presses the bead or rib 32 firmly into contact with the tapered seat 18. The lower end of a spring 39 rests on the top of the flange 33, and its upper end engages a button or disc member 40 carried by the upper end of the center pin 21, the lower end of the center pin being connected to the valve body 36. Through this arrangement the spring 39 operates to hold the valve body 36 in engagement with the valve seat 37, the button 40 being arranged normally to close opening 44 of sleeve 34.

The upper end of the sleeve 34 is enlarged to fit conventional inflating chucks and air gauges. The outer circumference of this enlarged portion is knurled at 42 to facilitate screwing it tightly into a valve stem. The bore of the head 42 is enlarged at 43 to permit free passage of air around the button 40 when the latter is depressed.

While the valve bodies 16 and 36 preferably are spherical and composed of hardened steel, it is to be understood that they may be conical or otherwise suitably shaped and may be composed of any other material having characteristics fitting it for use as the valve body. The buttons or heads 20 and 40 are of proper diameter snugly to fit the openings 26 and 44 of the sleeves 22 and 34 while being freely movable axially thereof.

Fig. 3 shows a modification wherein the valve body 16' is made of rubber or other suitable heat-resisting material vulcanized to or otherwise secured to the upset or flanged end 28 of pin 21'.

I claim:

1. In a device of the character described, a first tubular member having an interior shoulder intermediate its ends adapted to rest on the valve seat of a conventional valve stem of the type having a valve seat therein, said member being coated with soft metal from said shoulder to one of its ends, a valve seat provided at said last-named coated end, and an outwardly extending lateral flange at the opposite end of said member, a second tubular member having a threaded portion for threaded engagement with said standard valve stem, means on said second tubular member to engage said flange rotatably and permanently without permitting relative longitudinal displacement of said two tubular members, a steel spherical valve body adapted to seat against said coated end, a pin integral with and extending from said valve body through said tubular members and having a head closing an end of said second tubular member, said second tubular member being of larger interior diameter adjacent said last-named end than at said last-named end, and a spring interposed between said shoulder and said head, the said spring having one of its coil turns so admeasured as to frictionally engage the inner surface of said first tubular member and its other turns so admeasured as to clear said surface.

2. In a device of the character described, a tubular member having an exteriorly threaded portion adapted to be screwed into a conventional valve stem of the type having a valve seat therein, a tubular extension rotatably joined at one end to one end of said tubular member and forming a shoulder at the joint, said joint comprising a flange on said one end of said extension and a recess provided on said one end of said tubular member into which said flange extends, a rib or head formed on said tubular extension and adapted to engage with said valve seat, the other end of said extension being coated with soft metal, a spherical steel valve body adapted to seat against said coated end, a pin extending from said valve body through said extension and said member and having a head, and a spring interposed between said shoulder and said head, the said spring having its lowest coil so admeasured as to engage frictionally with the inner surface of said member adjacent said shoulder and having its other coils so admeasured as to clear said inner surface.

3. A tire valve comprising a barrel having an external shoulder adapted to engage the internal valve seat of a conventional valve stem, and an outwardly and laterally extending flange at the upper end of said barrel, a sleeve adapted to threadedly engage a threaded portion of said stem above said valve seat, said sleeve having an inwardly turned portion at its lower end providing a recess in which said flange fits to provide free and relative rotation between said barrel and said sleeve without relative longitudinal displacement, said barrel having a valve seat at its lower end, soft metallic coating on said barrel extending over the portion thereof beginning with its said external shoulder to and including its valve seat, a valve body adapted to co-operate with said coated valve seat, a center pin extending upwardly from said valve body through said barrel and said sleeve, a head on said pin adjacent its upper end so admeasured as to provide a closure for the upper end of said sleeve, and a spring surrounding said pin and extending between said head and said flange, said spring having an enlarged portion at its lower end resting on said flange and frictionally engaging the inner wall of said sleeve above said recess.

LEWIS C. BROECKER.